(12) United States Patent
Ito (10) Patent No.: US 6,923,500 B2
(45) Date of Patent: *Aug. 2, 2005

(54) SLIDING SUNSHADE OF SUNROOF FOR AUTOMOBILE

(75) Inventor: Tatsuro Ito, Katsugai (JP)

(73) Assignee: Howa Textile Industry Co., Ltd., Kasugai (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/429,351

(22) Filed: May 5, 2003

(65) Prior Publication Data

US 2003/0193218 A1 Oct. 16, 2003

Related U.S. Application Data

(63) Continuation of application No. 09/854,430, filed on May 11, 2001, now abandoned.

(30) Foreign Application Priority Data

Jul. 14, 2000 (JP) .................................... 2000-215135

(51) Int. Cl.[7] ................................................ B60J 7/00
(52) U.S. Cl. ..................................................... 296/214
(58) Field of Search ......................................... 296/214

(56) References Cited

U.S. PATENT DOCUMENTS

| 4,935,986 | A | * | 6/1990 | Church et al. | ............... | 16/93 R |
| 6,231,118 | B1 | * | 5/2001 | Yera | ............................ | 296/214 |
| 6,295,711 | B1 | * | 10/2001 | Shields et al. | ............... | 296/214 |
| 6,386,626 | B1 | * | 5/2002 | Makino et al. | ............... | 296/214 |
| 6,464,292 | B1 | * | 10/2002 | Manders | ...................... | 296/214 |

FOREIGN PATENT DOCUMENTS

JP           0246824      * 10/1990     ................. 296/214

* cited by examiner

*Primary Examiner*—Dennis H. Pedder
(74) *Attorney, Agent, or Firm*—Ohlandt, Greeley, Ruggiero & Perle, L.L.P.

(57) ABSTRACT

A sunshade includes a cut-out panel formed by cutting a portion from a ceiling panel for opening a ceiling window and injection-molded rigid edge members made of synthetic resin and fixed to a front edge, both side edges and a rear edge of the cut-out panel so as to surround the cut-out panel. The rigid edge members are fixed to the sunshade so that the sunshade is finished such that the width thereof is made wider than the width of the opening portion of the ceiling panel and the length thereof is made longer than the length of the opening portion thereof, the rigid edge member fixed to the front edge is formed with a knob, and slide shoes are provided to the rigid edge members fixed to the both edges of the cut-out panel. The invention realizes reduced weight and manufacturing cost and increased quality of the slide sunshade of automobile sunroofs.

6 Claims, 14 Drawing Sheets

SLIDING SUNSHADE OF SUNROOF FOR AUTOMOBILE

This is a continuation of application Ser. No. 09/854,430 filed May 11, 2001 now abandoned, which application is hereby incorporated by reference in its entirety.

BACKGROUND OF THE INVENTION

1. Field of the Invention

The present invention relates to a sunshade which is slidably provided to a sunroof of an automobile.

2. Description of the Related Art

Conventionally, a sunshade (sunshading plate) provided to a sunroof (ceiling window) of an automobile is supported to a roof of an automobile slidably in forward and rearward directions by slidably fitting both side edge portions of the sunshade to guide rails with a U-shaped sectional configuration provided to both side edge upper portions of an opening portion formed in a ceiling panel.

Such a conventional sunshade is structured by using such a metal plate as an aluminum plate, or a synthetic resin plate or a laminated plate with rigidity corresponding to that of the metal plate as a base plate and attaching an outer skin such as fabric to the interior side surface of the base plate. However, since it is necessary that the sunshade is difficult to deform and it must have a high rigidity, it has been difficult to reduce the weight and manufacturing cost of the sunshade.

Also, conventionally, a ceiling panel is structured by using a corrugated cardboard, a foamed urethane plate, a three layered structure plate which has been reinforced by attaching glass fiber layers to both surfaces of a foamed urethane layer, or the like as a base plate and attaching an outer skin such as fabric to the interior side surface of the base plate, and a portion of the ceiling panel is cut out for opening a ceiling window. However, a large number of cut-out panels which have been generated during cutting-out work are discarded as waste together with end materials, which results in a large amount of waste of materials.

Furthermore, in the conventional art, since a base plate for a sunshade and a base plate for a ceiling panel are made from different materials, even when outer skins with the same color are attached to these base plates, there is a possibility that the colors of both the base plates appear on their surfaces so that appearances of the sunshade may be deteriorated.

SUMMARY OF THE INVENTION

In view of the above circumstances, the present invention has been made and an object thereof is to utilize a cut-out panel formed by cutting a portion from a ceiling panel for opening a ceiling window effectively to realize reduction in weight and manufacturing cost of a sunshade and a high quality thereof.

According to the present invention, there is provided a sliding sunshade of a sunroof for an automobile comprising a cut-out panel formed by cutting a portion from a ceiling panel for opening a ceiling window and injection-molded rigid edge members made of synthetic resin and fixed to a front edge, both side edges and a rear edge of the cut-out panel so as to surround the cut-out panel, characterized in that the rigid edge members are fixed to the sunshade so that the sunshade is finished such that the width thereof is made wider than the width of the opening portion of the ceiling panel and the length thereof is made longer than the length of the opening portion thereof, and the rigid edge member fixed to the front edge is formed with a knob.

In the present invention, there is provided a sunshade, characterized in that slide shoes are provided to the rigid edge members fixed to both the side edges of the cut-out panel.

In the present invention, there is provided a sunshade, characterized in that the rigid edge members fixed to both the side edges of the cut-out panel and the rigid edge member fixed to the rear edge of the cut-out panel are formed integrally by synthetic resin injection molding.

Also, in the present invention, there is provided a sunshade, characterized in that the ceiling panel is a panel obtained by attaching a outer skin to an interior side surface of a three layered base plate which has been reinforced by providing glass fiber mats to both surfaces of a foamed urethane layer.

In the present invention, there is provided a sunshade, characterized in that a ventilation hole is formed in the rigid edge member fixed to the front edge.

DETAILED DESCRIPTION OF THE PREFERRED EMBODIMENTS

Figure 1:
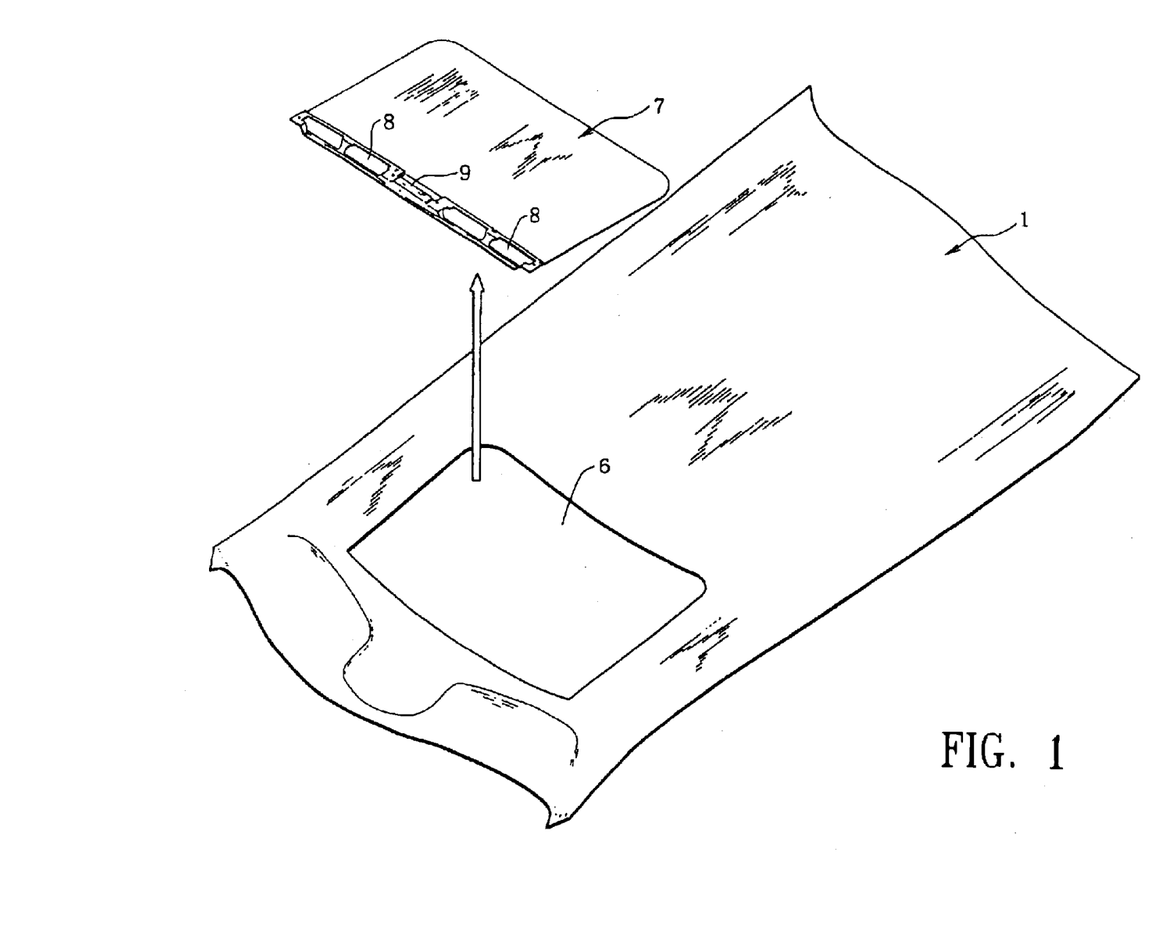
FIG. 1 is a perspective view of a ceiling panel and a cut-out panel constituting a sunroof for an automobile according to the present invention.
Figure 2:
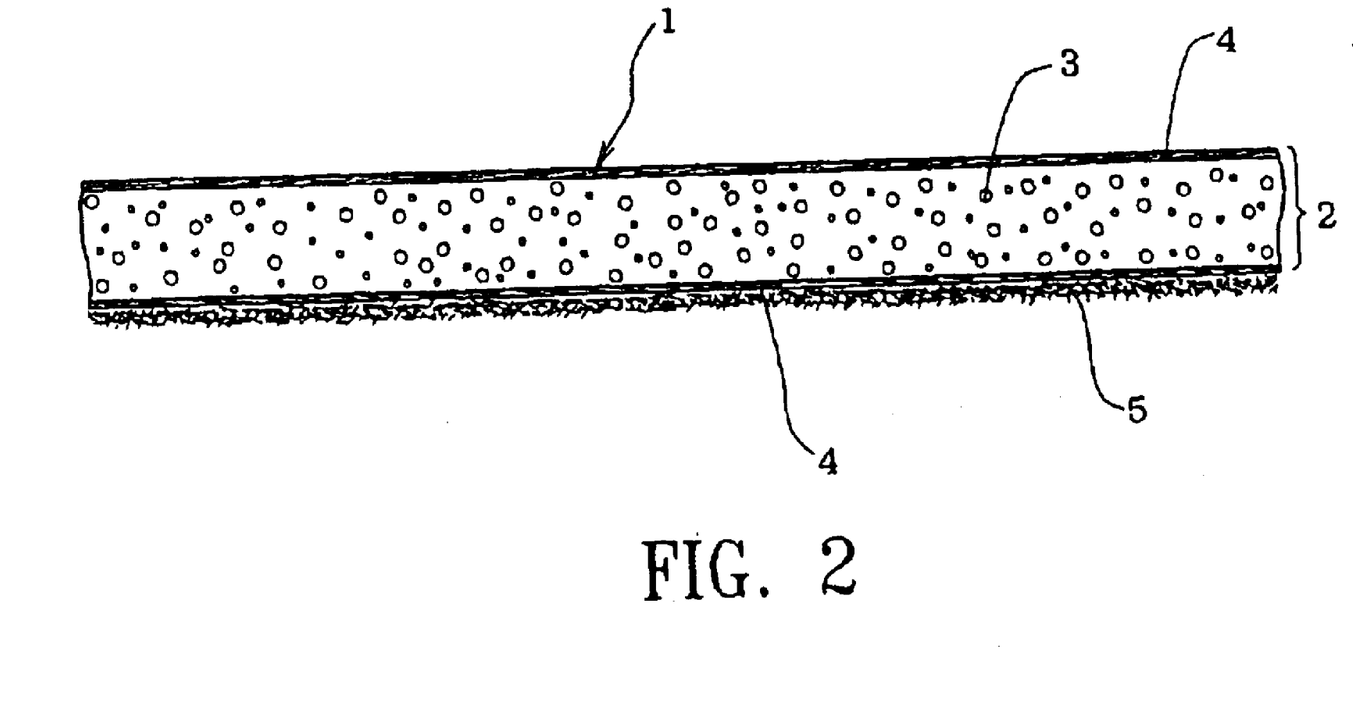
FIG. 2 is an enlarged cross-sectional view of the ceiling panel in FIG. 1.

Next, an embodiment of the present invention will be explained with reference to the drawings. FIG. 1 is a perspective view of a ceiling panel 1. As shown with a sectional view in FIG. 2, the ceiling panel 1 is formed in a required 3-dimensional shape by integrating a three layered base plate 2 in a forming mold, the base plate 2 being reinforced by providing glass fiber mats 4 to both surfaces of a foamed urethane layer 3, and attaching an outer skin 5 comprising fabric to an interior side surface of the base plate 2. Reference numeral 6 denotes an opening serving as a ceiling window formed by cutting out a portion from the ceiling panel 1 and reference numeral 7 denotes a cut-out panel formed by this cutting-out.

Figure 3:
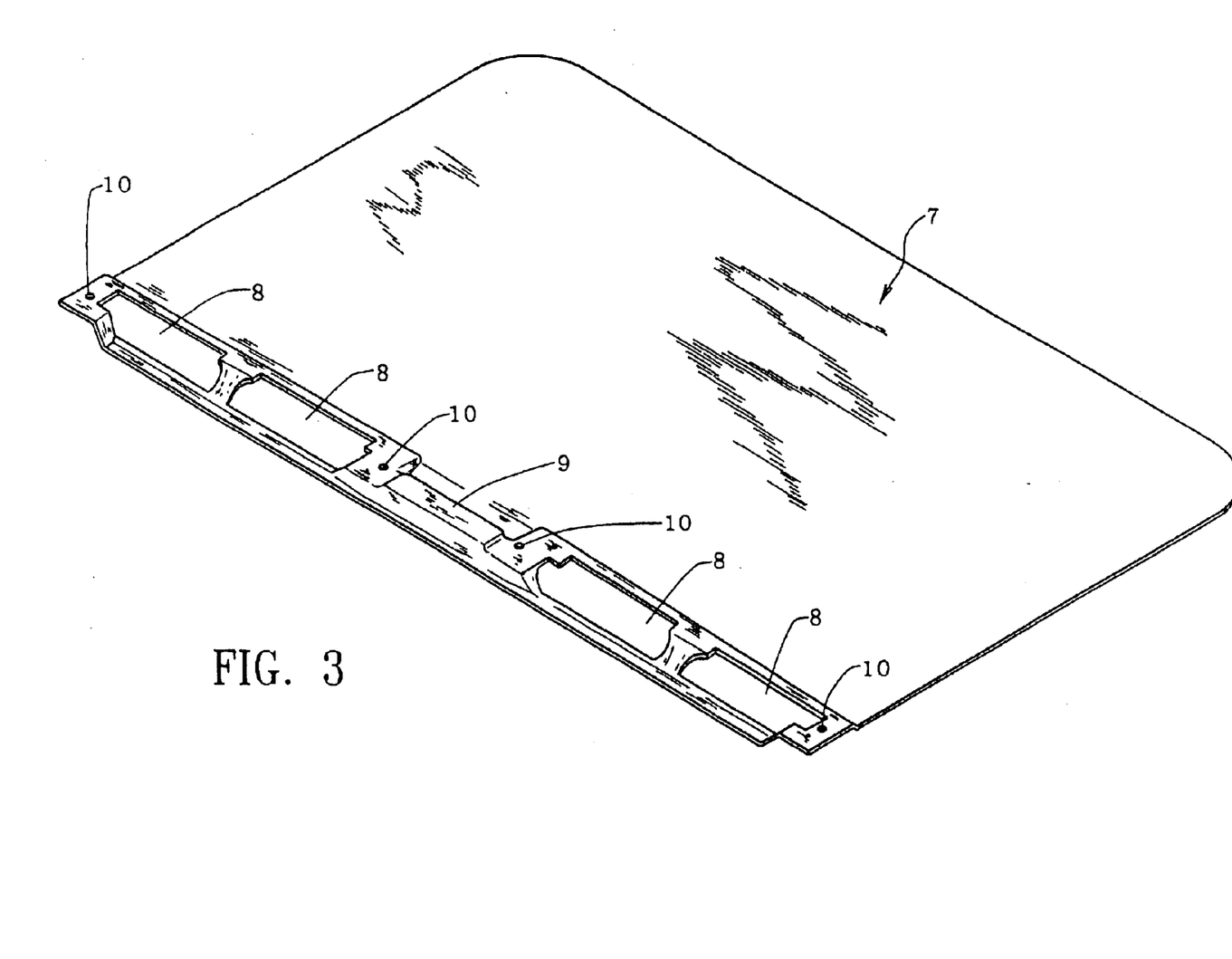
FIG. 3 is a perspective view of the cut-out panel of a sunshade which is an embodiment of the present invention.

As shown on a large scale in FIG. 3, the cut-out panel 7 is formed with rectangular holes 8 for mounting a ventilation portion which have been cut out near a front edge of cut-out panel 7 at a time of cutting-out work. Reference numeral 9 denotes a handle mounting portion which has been formed with pressure near to a front edge of the cut-out panel 7 and at a central portion thereof so as to project upward in an inverse U-shape, and reference numeral 10 denotes small holes for screw insertion which have been opened at the same time as the pressurizing forming.

Figure 4:
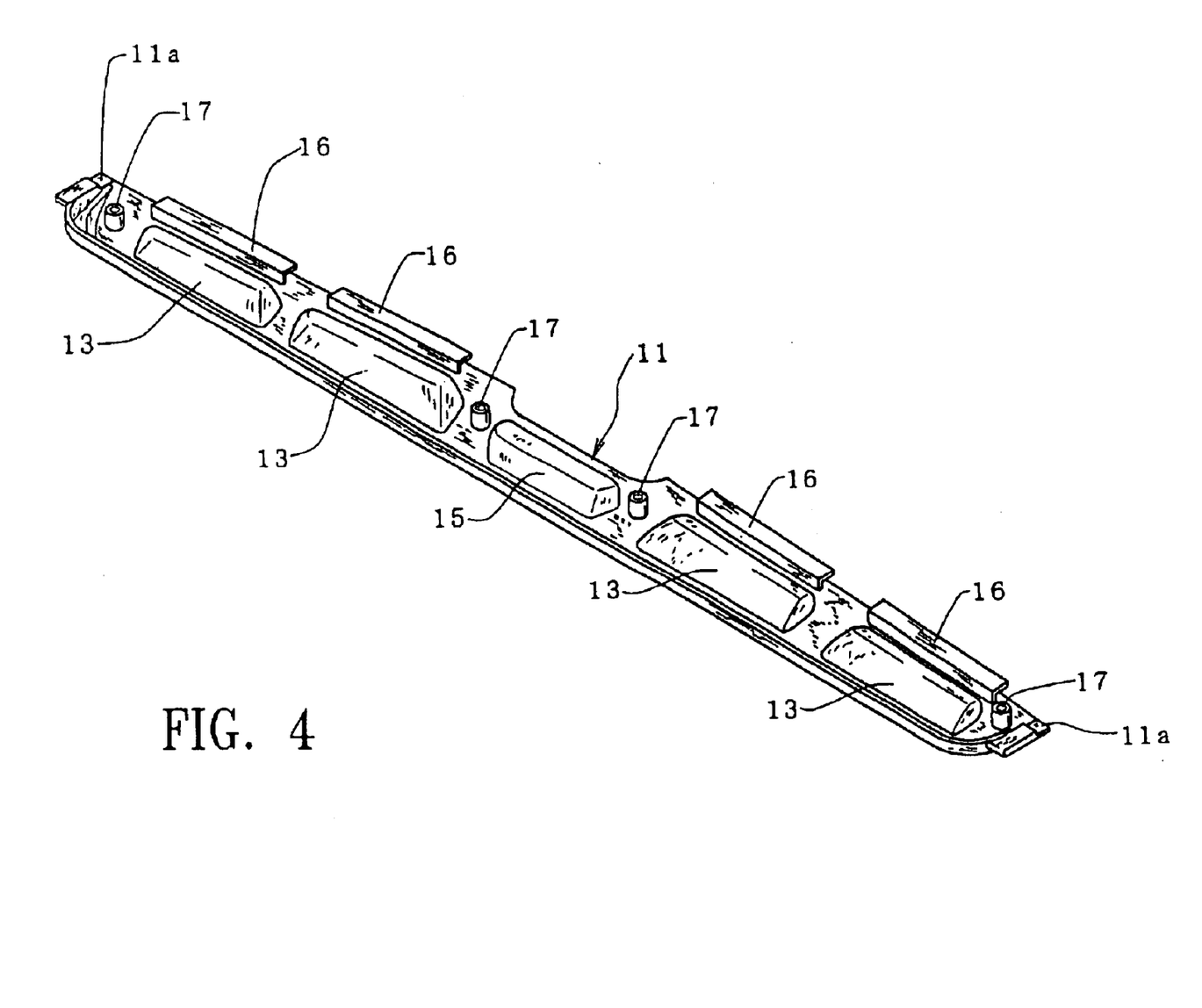
FIG. 4 is a perspective view of the rigid edge member of the sunshade, which is an embodiment of the present invention.
Figure 5:
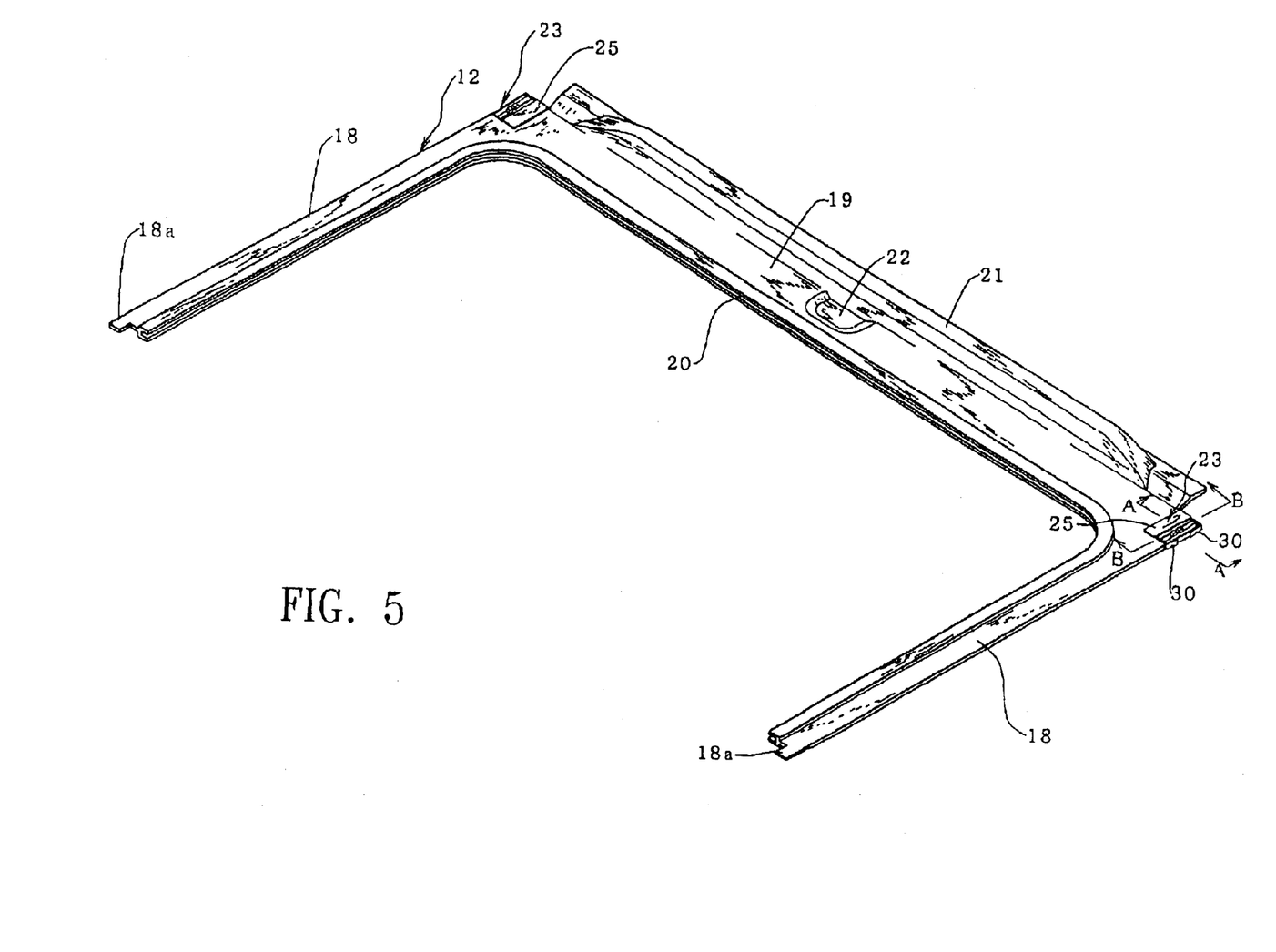
FIG. 5 is a perspective view of another rigid edge member of the sunshade, which is an embodiment of the present invention.
Figure 9:
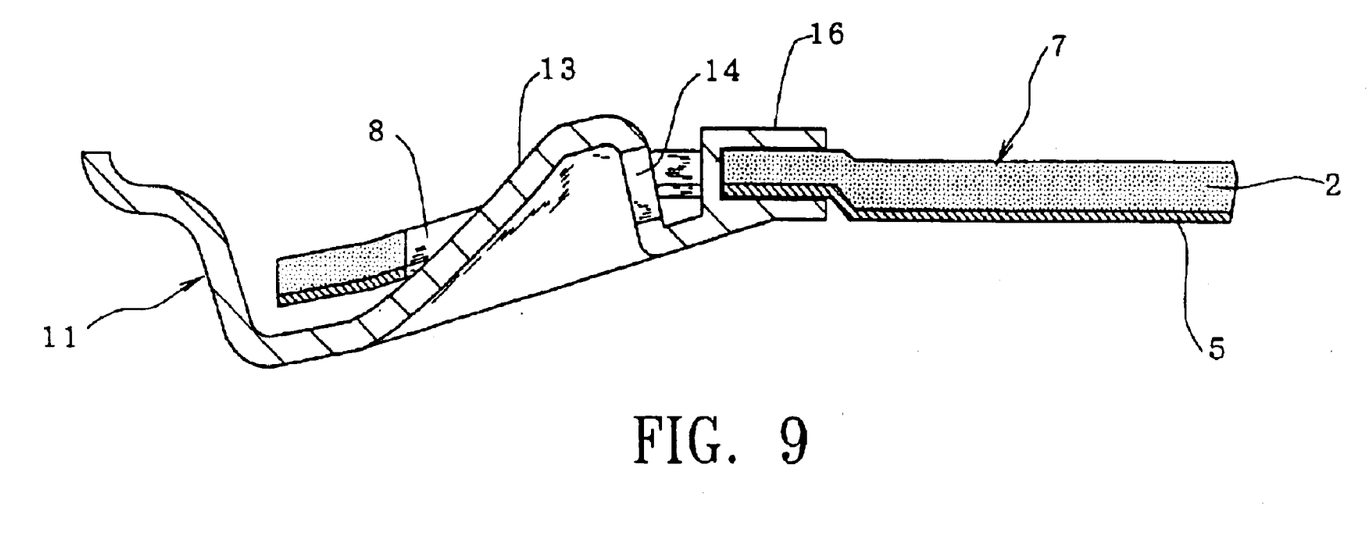
FIG. 9 is an enlarged sectional view taken along C—C line in FIG. 8.
Figure 10:
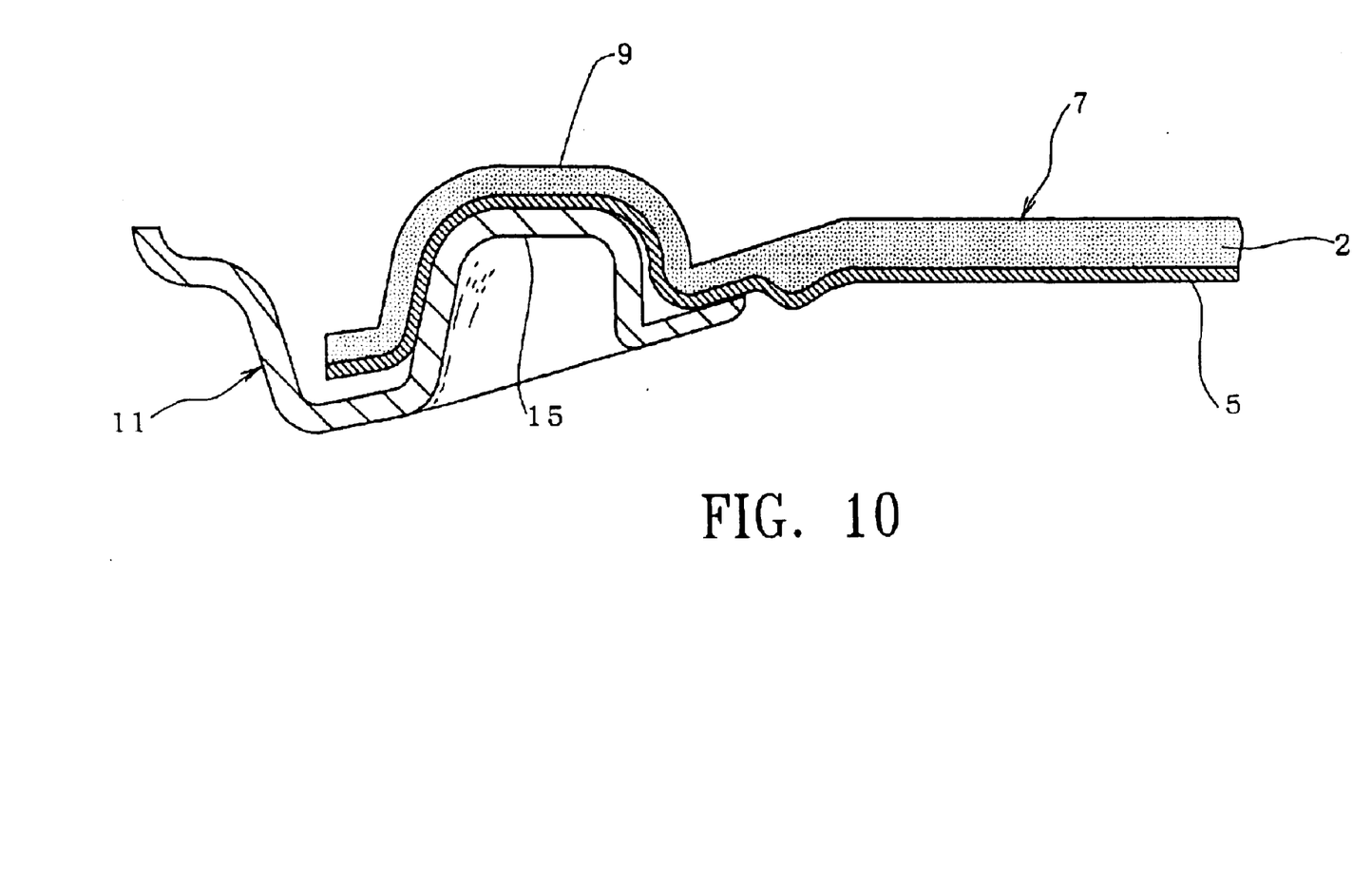
FIG. 10 is an enlarged sectional view taken along D—D line in FIG. 8.
Figure 11:
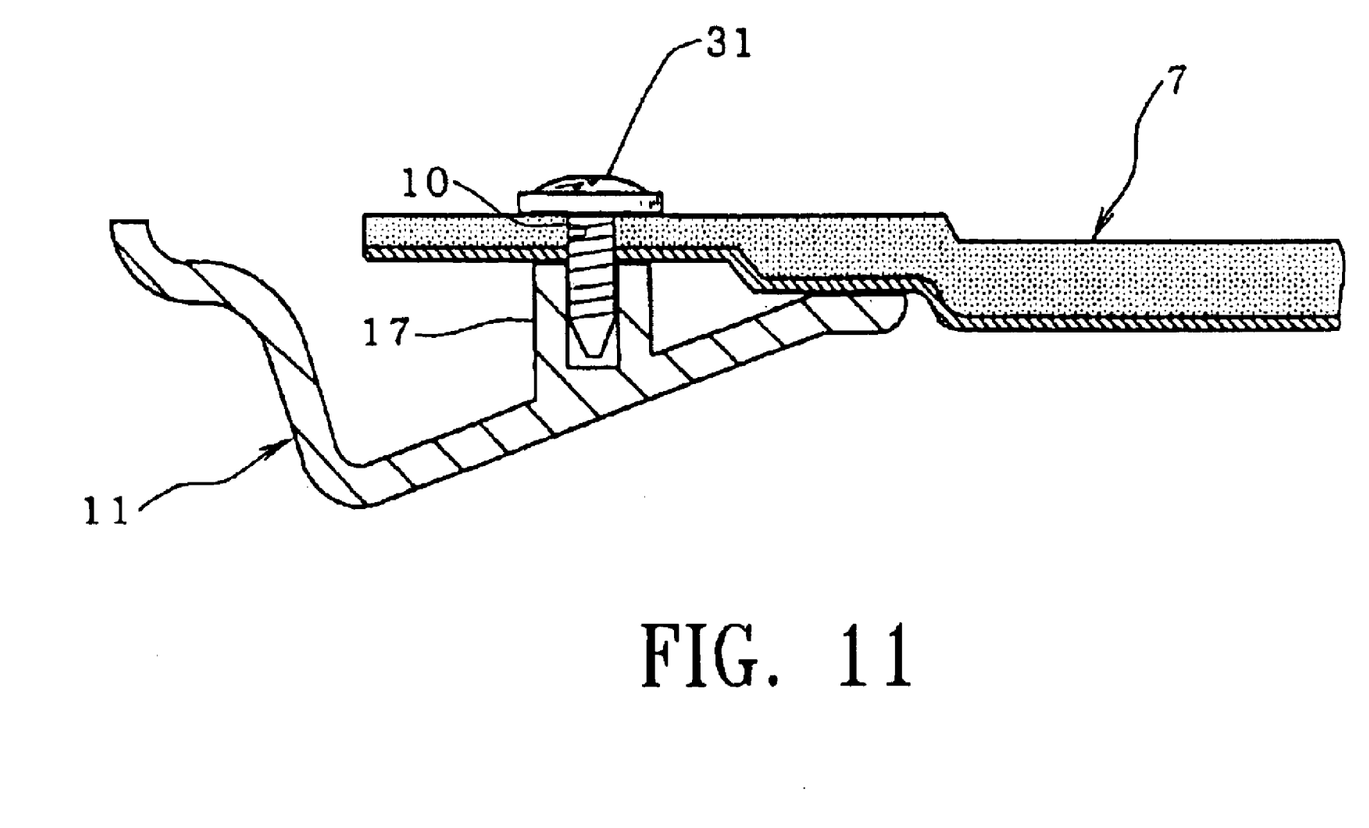
FIG. 11 is an enlarged sectional view taken along E—E line in FIG. 8.
Figure 12:
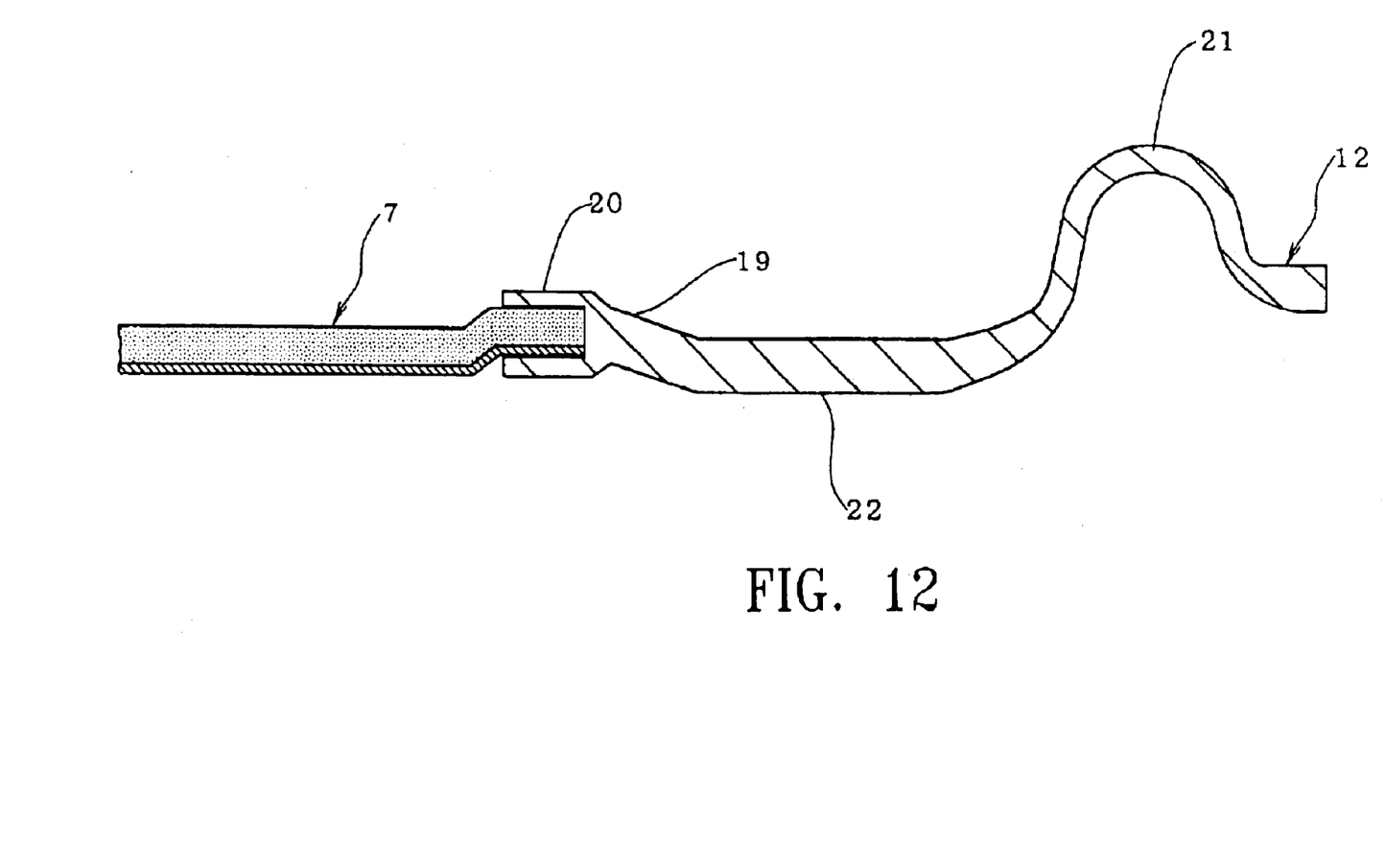
FIG. 12 is an enlarged sectional view taken along F—F line in FIG. 8.

A sunshade of the present invention comprises the cut-out panel 7 shown in FIG. 3, a rigid edge member 11 shown in FIG. 4 and a rigid edge member 12 shown in FIG. 5. The rigid edge member 11 fixed to a front edge of the cut-out panel 7 is manufactured by injection molding where ABC resin is injected into a predetermined forming mold. The rigid edge member 11 is provided at predetermined intervals with four protrusions 13 for ventilation which project upwardly and which are recessed towards the interior side of an automobile, and ventilation ports 14 (shown in FIG. 9) are provided on rear side walls of the protrusions 13. Also, a handle 15 which projects upwardly and is recessed towards the interior side is formed on a central portion of the rigid edge member 11. Furthermore, reference numeral 16 denotes channel groove forming portions which are formed on rear sides of the respective protrusions 13 integrally with the rigid edge member 11 and in which opening edges of the rectangular holes 8 are inserted, and reference number 17 denotes bosses for screw threading which are provided on an upper surface of the rigid edge member 11 in an upwardly projecting manner.

Also, the rigid edge member 12 is manufactured by injection molding where ABC resin is injected into a predetermined forming mold in the same manner as the case of the rigid edge member 11. In the rigid edge member 12, a pair of side edge fixing portions 18 fixed to both side edges of the cut-out panel 7 and a rear edge fixing portion 19 fixed to a rear edge of the cut-out panel 7 are formed integrally in a U shape, and a channel groove forming portion 20 in which an insertion groove in which both the side edges and the rear edge of the cut-out panel 7 are inserted is continuously formed in the inner peripheral edges of the side edge fixing portions 18 and the rear edge fixing portion 19. Furthermore, on the rear edge fixing portion 19, along its longitudinal direction a rib 21, which projects upwardly and which is recessed on its interior side, is formed so that the rigidity of the rigid edge member 12 is further increased by this rib 21. Also, reference numeral 22 denotes a support portion formed on a front side central portion of the rib 21 such that it projects downward and its upper surface side is recessed. Incidentally, each length of the side edge fixing portions 18 is set such that front end portions 18a of the side edge fixing portions 18 are respectively overlapped on both end portions 11a of the ridge edge member 11.

Figure 6:
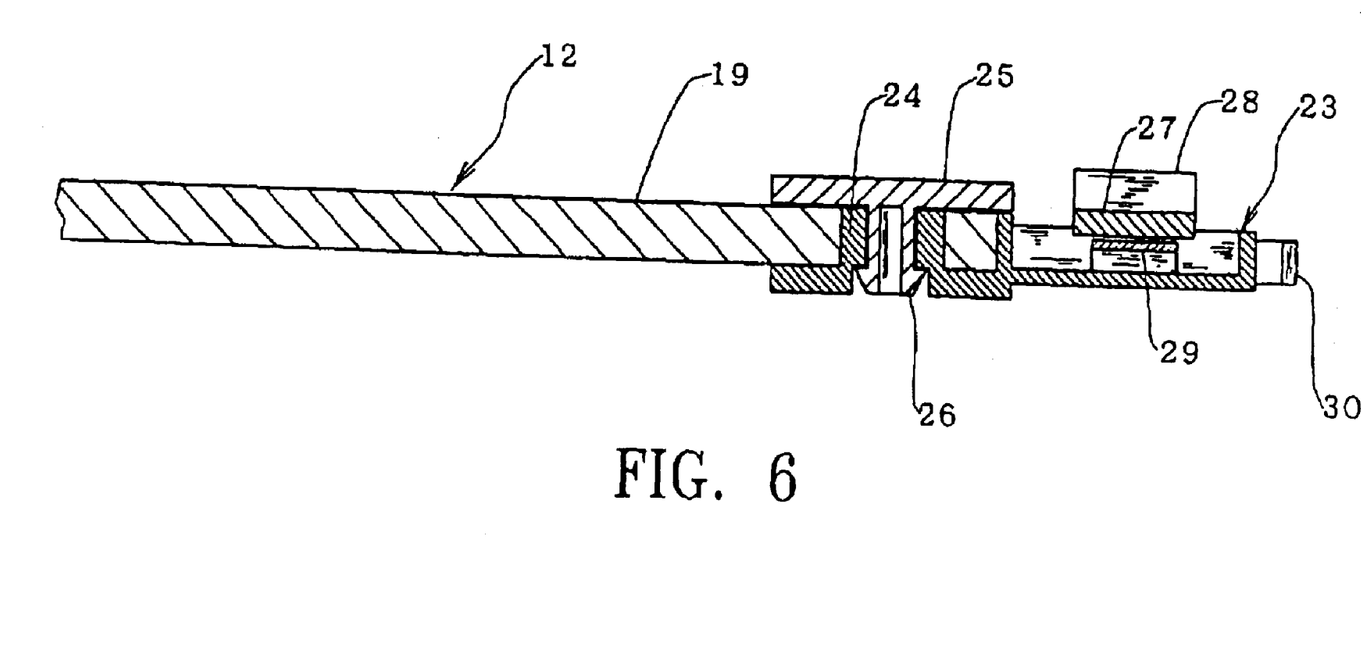
FIG. 6 is an enlarged sectional view taken along line A—A in FIG. 5.
Figure 7:
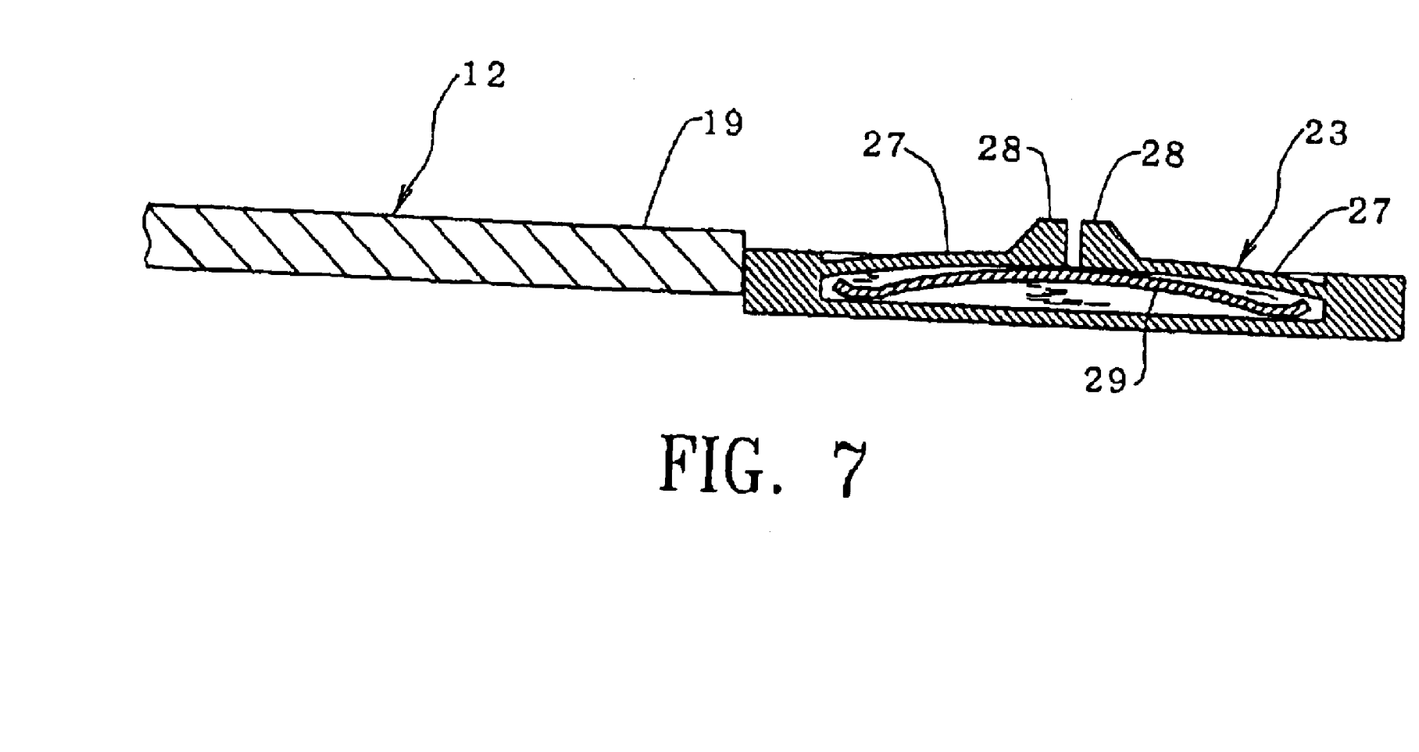
FIG. 7 is an enlarged sectional view taken along line B—B in FIG. 5.

Also, reference numeral 23 denotes slide shoes formed of polyacetal resin with abrasion resistance. As a mounting portion of the slide shoe 23 is shown with a sectional view in FIG. 6, hollow shafts 24 which are respectively formed integrally with the slide shoes 23 on portions thereof are fitted into mounting holes formed in both the end portions of the rear edge fixing portion 19 from the bottom, while pawl shafts 26 formed on mounting plates 25 are fitted into the hollow shafts 24 from the top, so that the slide shoes 23 are respectively fixed to both the end portions of the rear edge fixing portion 19. As shown in FIG. 7, in each of the slide shoes 23, a pair of shoe main bodies 28 are formed on front ends of shaft portions 27 formed integrally therewith so as to flex elastically, and the shoe main bodies 28 are resiliently supported from the bottom by a leaf spring 29. Reference numeral 30 denotes a pair of bristle-like elastic pieces provided in a projecting manner on an outer side surface of the slide shoe 23.

Figure 8:
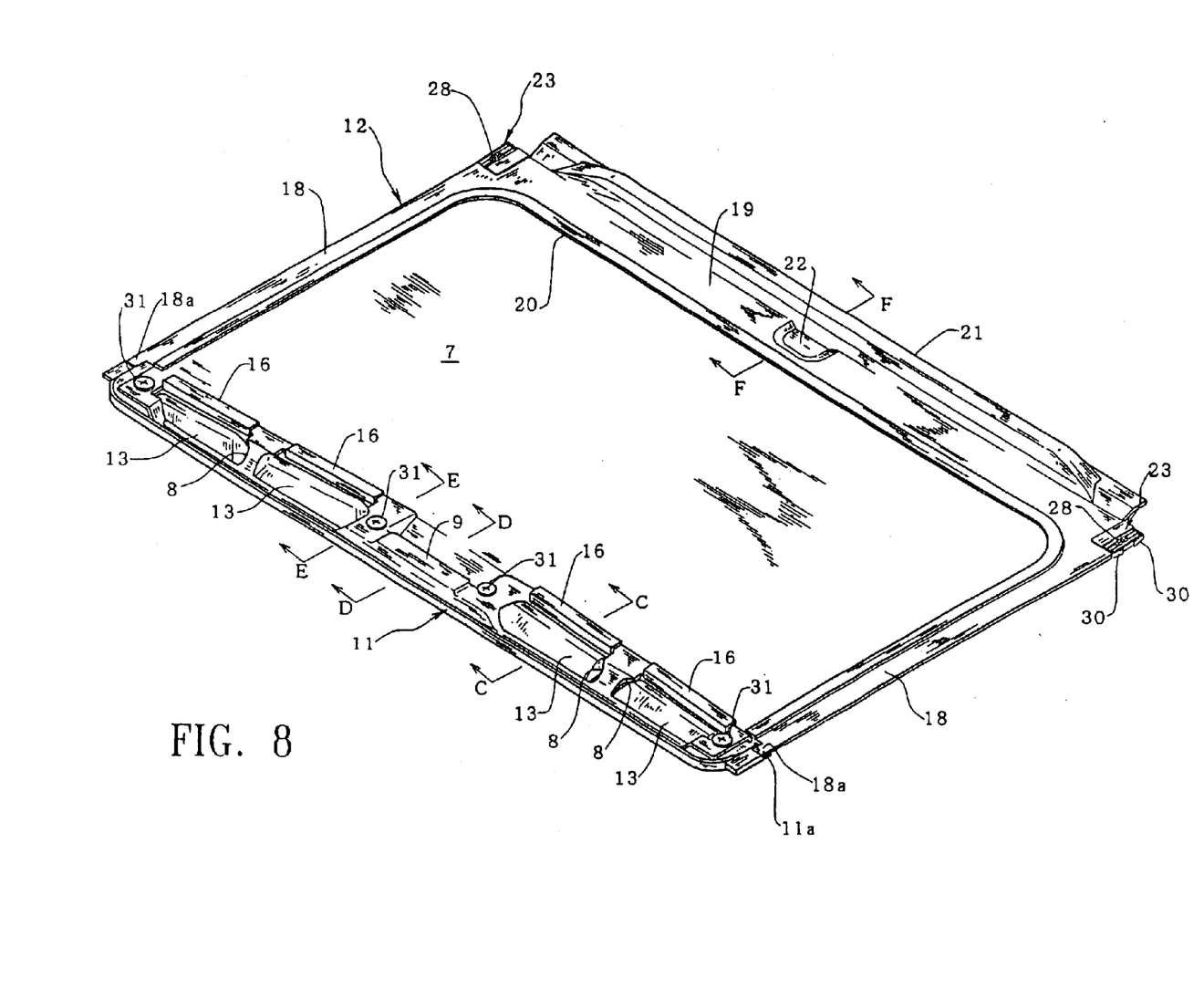
FIG. 8 is a perspective view showing an assembled state of the sunshade which is an embodiment of the present invention.

As an assembled state of the sunshade of the present invention is shown in FIG. 8, the sunshade is assembled by the steps of: inserting both the side edges and the rear edge of the cut-out panel 7 into the insertion groove formed in the channel groove forming portion 20 of the rigid edge member 12; overlapping the rigid edge member 11 with the front edge of the cut-out panel 7 from the bottom thereof, as shown in FIGS. 9 to 12; inserting the opening edges of the rectangular holes 8 into the insertion groove formed in the channel groove forming portion 16; and inserting and fixing screws 31 through the small holes 10 into the bosses 17. Thus, the sunshade according to the present invention is finished such that its width is wider than that of the opening 6 of the ceiling panel 1 and its length is larger than that of the opening 6.

Figure 13:
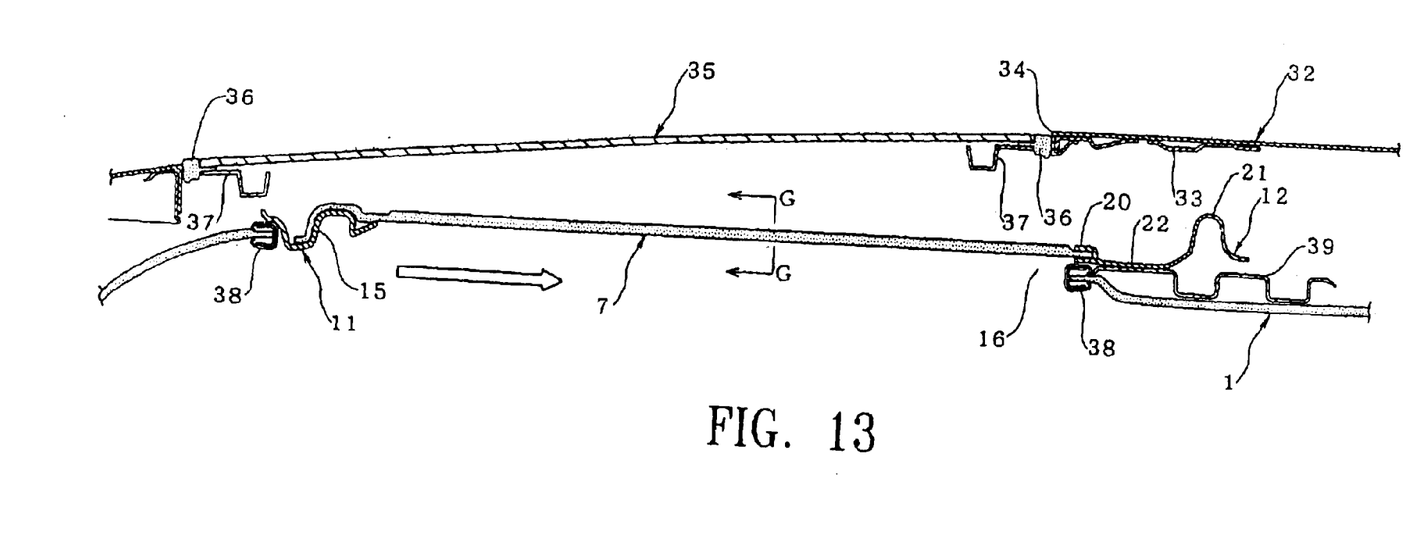
FIG. 13 is a longitudinal sectional view of the sunroof showing a usage state of the sunshade showing the embodiment of the present invention.

FIG. 13 is a longitudinal sectional view of the sunroof showing a usage state of the sunshade thus structured, where reference numeral 32 denotes an automobile roof, 33 denotes a reinforcement member therefor, 34 denotes a window opening provided in the roof, 35 denotes a ceiling window glass mounted to the window opening 34 such that opening/closing is allowed by an electric opening/closing mechanism (not shown), 36 denotes a packing provided so as to surround the ceiling window glass, and 37 denotes a garnish of the ceiling window glass. The ceiling panel 1 is disposed below the roof 32 via a predetermined space. Reference numeral 38 denotes a trimming member provided on an inner peripheral edge of the opening 6 of the ceiling panel 1. Incidentally, 39 denotes a supporting beam comprising a corrugated steel plate which is disposed on the rear side of the opening 6 on an upper portion of the ceiling panel 1.

Figure 14:
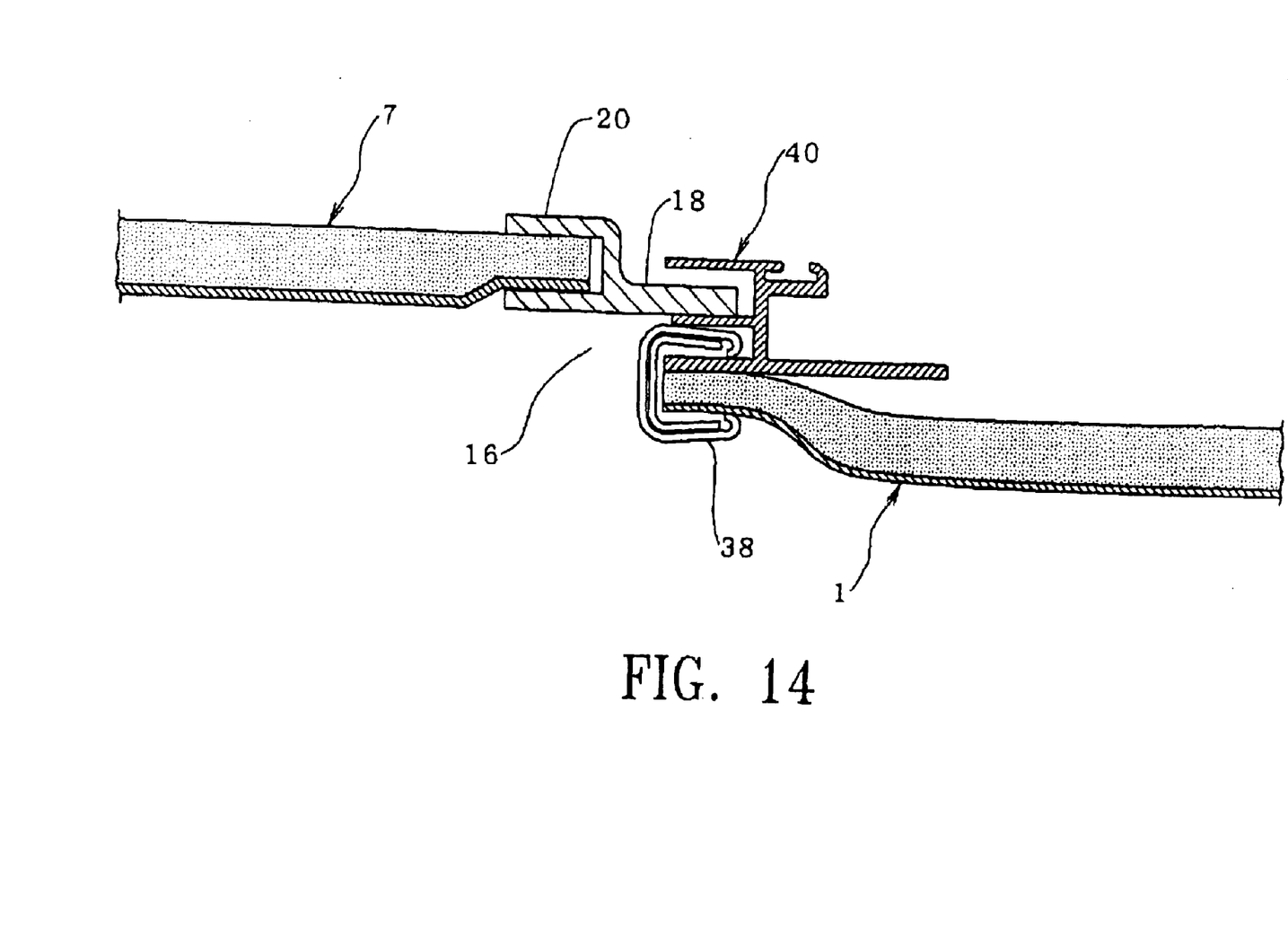
FIG. 14 is a partial enlarged sectional view taken along G—G line in FIG. 13.

As shown in FIG. 14, guide rails 40 are provided on both side edge upper portions of the opening 6, and the side edge fixing portions 18 of the sunshade are slidably received in the guide rails 40. The shoe main bodies 28 of the side shoes 23 are brought in resilient contact with upper inner faces of the guide rails 40, and the elastic pieces 30 come in resilient contact with inner side faces of the guide rails 40. Then, by grasping handle 15 from the interior side of the automobile to push/draw the sunshade in the front/rear directions, the sunshade is smoothly slid along the guide rails 40. Incidentally, as shown, in a state where the sunshade is fully closed, the support portion 22 rides on the supporting beam 39.

In the sunshade, the cut-out panel 7 is surrounded and reinforced by the rigid edge members 11 and 12 manufactured by the synthetic resin injection molding so that its rigidity is improved. Therefore, though the cut-out panel 7 is made of the same material as that of the ceiling panel 1, it will not interfere with the cut-out panel 7 by flexing during use or by deforming during long term use, so that its shape can be kept stable for a long time. Also, since the cut-out panel 7 and the ceiling panel 1 are made of the same material, the color of the outer skin 5 can be caused to coincide with that of the cut-out panel 7 and the ceiling panel 1 so that the appearance of the sunshade can be improved.

Also, since the sunshade shown in the embodiment can be assembled simply by inserting the cut-out panel 7 which has been obtained by cutting a portion from the ceiling panel 1 into the insertion grooves of the rigid edge members 11 and 12 without trimming the edges of the cut-out panel 7, productivity can be improved and end materials which have been wasted in the conventional art an be utilized effectively in the assembly so that manufacturing costs can be reduced significantly. Incidentally, in the embodiment, the slide shoes 23 are provided on the rigid edge member 12 as separate members, but slide shoes may be formed integrally with the rigid edge member 12. Also, slide shoes may be provided at both end portions of the rigid edge member 11. Furthermore, as the material for the ceiling panel 1, a corrugated cardboard or the like may be used instead of the three-layered plate shown in the embodiment.

As set forth above, since the sliding sunshade of a sunroof for an automobile according to the present invention comprises a cut-out panel formed by cutting a portion from a ceiling panel for opening a ceiling window and injection-molded rigid edge members made of synthetic resin fixed to a front edge, both side edges and a rear edge of the cut-out panel so as to surround the cut-out panel, such various advantages can be obtained that materials which have been wasted in the conventional art can be utilized effectively, saving of materials and reduction in manufacturing costs can be achieved, and the weight of the sunshade of the present invention can be reduced as compared with the conventional sunshade where a metal plate or the like is used as a base plate.

We claim:

1. A sliding sunshade comprising:

a cut-out panel formed by cutting a portion from a ceiling panel, wherein removing the portion from the ceiling panel defines an opening for a ceiling window;

rigid edge members disposed at a front edge, two side edges, and a rear edge of the cut-out panel, wherein the rigid edge members are fixed to the cut-out panel so that the length and width of the sunshade are greater than the length and width of the opening; and first spring members mounted to the rigid edge members at the side edges of the cut-out panel, wherein the first spring members are configured to urge contact members outwardly away from the cut-out panel, wherein the rigid edge members include structure defining an inner space and flexible shaft portions, wherein the first spring members are received inside the inner space and configured to urge the flexible shaft portion outwardly away from the cut-out panel, and wherein the contact members are mounted to the flexible shaft portions.

2. A sliding sunshade comprising:

a cut-out panel formed by cutting a portion from a ceiling panel, wherein removing the portion from the ceiling panel defines an opening for a ceiling window;

rigid edge members disposed at a front edge, two side edges, and a rear edge of the cut-out panel, wherein the rigid edge members are fixed to the cut-out panel so that the length and width of the sunshade are greater than the length and width of the opening; and first spring members mounted to the rigid edge members at the side edges of the cut-out panel, wherein the first spring members are configured to urge contact members outwardly away from the cut-out panel, wherein the rigid edge members include structure defining an inner space and flexible shaft portions, wherein the first spring members are received inside the inner space and configured to urge the flexible shaft portion outwardly away from the cut-out panel, and wherein the contact members are mounted to the flexible shaft portions, wherein the first spring members are leaf springs.

3. A sliding sunshade assembly comprising:

a cut out panel formed by cutting a portion from a ceiling panel, wherein removing the portion from the ceiling panel defines an opening for a ceiling window;

rigid edge members disposed at a front edge, two side edges, and a rear edge of the cut-out panel, wherein the rigid edge members are fixed to the cut-out panel so that the length and width of the sunshade are greater than the length and width of the opening;

first spring members mounted to the rigid edge members at the side edges of the cut-out panel, wherein the first spring members are configured to urge contact members outwardly away from the cut-out panel; and guide rails at the side edges of the cut-out panels;

wherein the rigid edge members are slidable along the side rails, wherein the first spring members are configured to urge the contact members into sliding contact with the guide rails, wherein the rigid edge members include structure defining an inner space and flexible shaft portions, wherein the first spring members are received inside the inner space and configured to urge the flexible shaft portions outwardly away from the cut-out panel, and wherein the contact members are mounted to the flexible shaft portions.

4. The sunshade assembly of claim 3, wherein the first spring members are leaf springs.

5. The sunshade of claim 1, and further comprising elastic pieces mounted to the rigid edge members at the side edges of the cut-out panel, wherein the elastic pieces resiliently project outwardly away from the cut-out panel in a direction substantially perpendicular to the urging direction of the first spring members.

6. The sunshade of claim 3, and further comprising elastic pieces mounted to the rigid edge members at the side edges of the cut-out panel, wherein the elastic pieces resiliently project into sliding contact with the guide rails in a direction substantially perpendicular to the urging direction of the first spring members.

* * * * *